United States Patent [19]

Ohorodnik et al.

[11] 4,171,427
[45] Oct. 16, 1979

[54] PROCESS FOR CONTINUOUSLY REMOVING MONOMERS FROM AN AQUEOUS DISPERSION OF A POLYMER

[75] Inventors: Alexander Ohorodnik, Erftstadt-Liblar; Karl Kaiser, Brühl; Rudolf Wesselmann, Ertstadt-Lechenich, all of Fed. Rep. of Germany

[73] Assignee: Hoechst Aktiengesellschaft, Frankfurt am Main, Fed. Rep. of Germany

[21] Appl. No.: 839,765

[22] Filed: Oct. 6, 1977

Related U.S. Application Data

[63] Continuation of Ser. No. 686,162, May 13, 1976, abandoned.

[30] Foreign Application Priority Data

May 16, 1975 [DE] Fed. Rep. of Germany ....... 2521780

[51] Int. Cl.² ............................. C08F 6/16; C08F 6/24
[52] U.S. Cl. ................................. 528/500; 422/138; 526/344.3
[58] Field of Search ............................. 528/499, 500

[56] References Cited

U.S. PATENT DOCUMENTS

| 3,622,553 | 11/1971 | Cines ................................. 526/344 X |
| 3,772,262 | 11/1973 | Clementi ............................. 528/500 |
| 3,793,259 | 2/1974 | Brinkman ........................ 526/344 X |
| 3,926,927 | 12/1975 | Stookey ............................. 159/48 R |
| 3,954,910 | 5/1976 | Kropp ............................. 528/499 X |
| 3,956,249 | 5/1976 | Goodman ............................. 528/500 |

FOREIGN PATENT DOCUMENTS

| 1248943 | 8/1967 | Fed. Rep. of Germany ........... 528/500 |
| 2331895 | 1/1974 | Fed. Rep. of Germany ........... 528/500 |

*Primary Examiner*—C. A. Henderson
*Attorney, Agent, or Firm*—Connolly and Hutz

[57] ABSTRACT

Monomeric matter is removed from an aqueous dispersion of a polymer containing at least 50 weight % of polymerized vinyl chloride. To this end, the dispersion is introduced into the upper portion of a column provided with sieve plates and contacted therein for 10 seconds up to 20 minutes, under 600 up to 1200 mm Hg, with hot steam at 100° up to 150° C. flowing countercurrently with respect to the dispersion. The polymer dispersion so treated is removed from the column base portion; and a vaporous matter mixture issuing at the head of the column is condensed stagewise so as to recover an aqueous phase and the monomeric matter.

10 Claims, 1 Drawing Figure

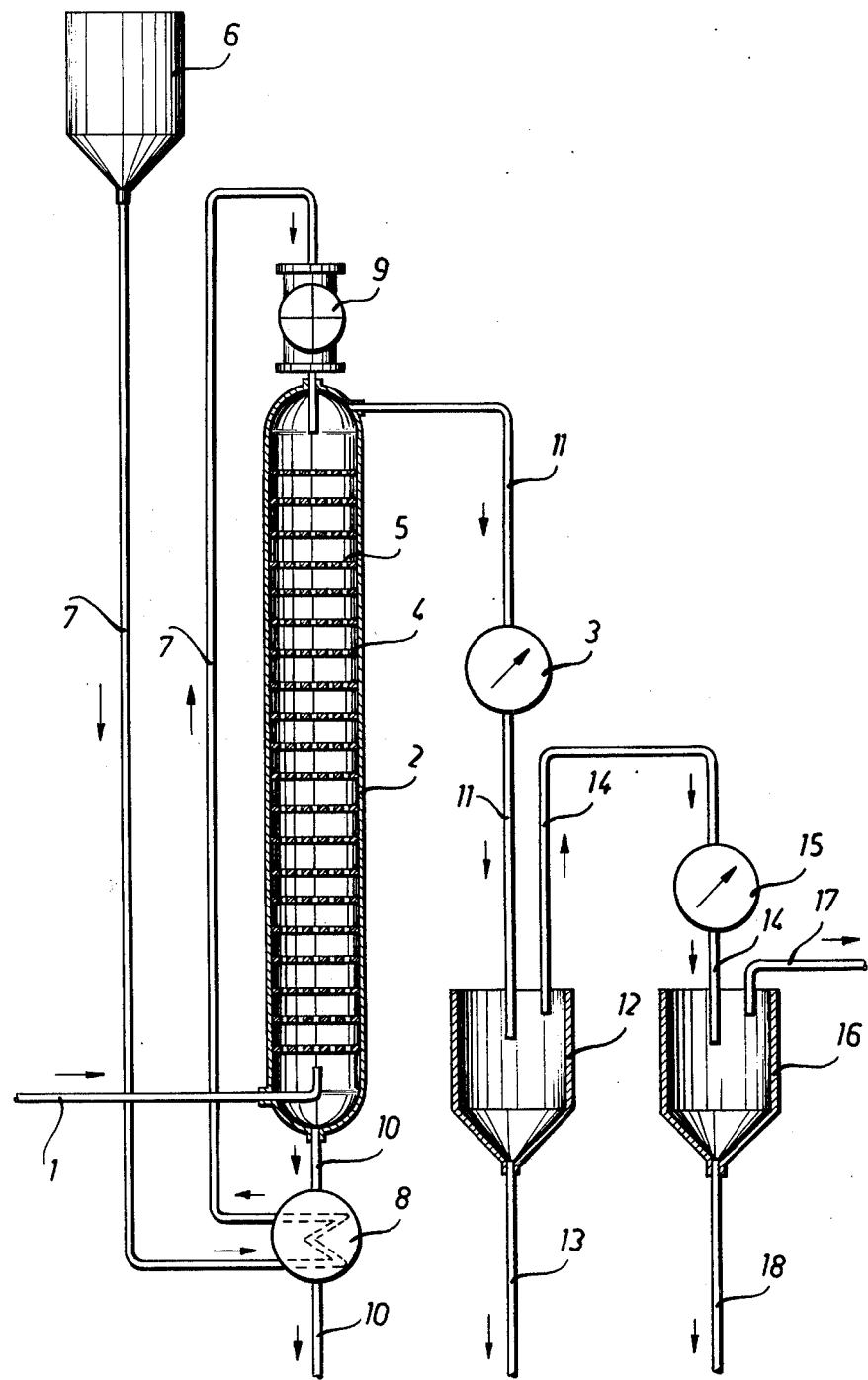

PROCESS FOR CONTINUOUSLY REMOVING MONOMERS FROM AN AQUEOUS DISPERSION OF A POLYMER

This application is a continuation of copending prior application Ser. No. 686,162 filed May 13, 1976 by the same inventors, now abandoned.

BACKGROUND OF THE INVENTION

The present invention relates to a process for freeing an aqueous dispersion of a polymer from a monomer present therein, the polymer, which may be a homopolymer, graft polymer or copolymer, having an extremely minor concentration of residual monomer after purification.

It has long been known that aqueous polymer dispersions can be freed from volatile constituents by flowing an inert gas or steam at about 60°–70° C. through the dispersion, i.e. by subjecting the dispersion to steam distillation. This has been described in German Published Specification ("Auslegeschrift") No. 1,248,943, and in "Kunststoffe" (1959), volume 49, No. 10, page 499, and also in "Chemical Engineering", March 1972, page 96.

In those cases in which aqueous polyvinyl chloride suspensions are worked up under the conditions just described, the polymer is subsequently dried by means of air, whereby it is freed from a further proportion of vinyl chloride, e.g. about 2 weight %, based on the quantity of vinyl chloride subjected to polymerization, which is allowed to escape into the atmosphere. In other words, the issuing gas contains vinyl chloride in proportions which are clearly beyond an acceptable emission limit, namely beyond the limit of 150 mg of vinyl chloride per cubic meter of issuing gas. In addition to this, excessive proportions of vinyl chloride go into the waste water. Despite this, the final dry polyvinyl chloride still contains several hundred ppm of monomeric vinyl chloride, which is absorbed in the polymer and cannot be removed therefrom by the purifying procedure described above.

One of the uses of polyvinyl chloride sheets is in packing food, which is hazardous inasmuch as residual monomers contained in the polymer may migrate into the food. It is therefore obligatory for the dry monomer-containing polymers to be subjected to an additional special purifying treatment.

A process wherein dry polyvinyl chloride made in conventional manner is freed from residual vinyl chloride, which is embedded or occluded in the polymer particles, has been described in German Published Specification ("Offenlegungsschrift") No. 2,331,895. This process, which enables polyvinyl chloride to be freed from vinyl chloride and further comonomers, if any, comprises: heating the polymer to a temperature ranging from its freezing temperature to 180° C. by directly condensing steam thereonto; maintaining the polymer at that temperature for the period necessary to free it from the bulk of monomer or monomers therein; and cooling the polymer down to a temperature lower than its freezing point by evaporating the steam condensed on the polymer. A preferred embodiment of this process comprises heating the polymer to a temperature ranging from 80° to 130° C. and allowing it to remain at that temperature for a period of about 5 minutes up to 2 hours, especially 10 to 60 minutes. Typical of this known process is that the degasification is effected at the dew point of water, as described in the working Examples of that Specification.

A disadvantage encountered with this earlier process resides in the fact that the polymer so purified continues to present relatively high proportions of monomers. As shown in Example 1 of German Published Specification ("Offenlegungsschrift" No. 2,331,895, the purified polymer contains 3 g (or 3,000 ppm) of residual monomers per kg of polymer. This known process is effected at temperatures and under pressures which correspond to the dew point of water under the conditions selected, which naturally means high and commercially unattractive consumption of steam.

SUMMARY OF THE INVENTION

In clear contrast therewith, the present invention provides a process permitting an aqueous polymer dispersion to be freed from monomeric matter with the resultant formation of a purified product containing a few ppm of residual monomer(s), the purified product presenting this minor concentration of residual monomer(s) being obtained much more rapidly than in the prior processes of which we are aware.

The following properties of a vinyl chloride/water/polyvinyl chloride-system are of importance to the removal of monomeric vinyl chloride from an aqueous polyvinyl chloride dispersion, and should conveniently be considered in effecting such operation.

(a) Bunsen's solubility coefficient $\alpha$ of vinyl chloride in water, which has the following values at temperatures of from 0.1° C. up to 100° C.:

0.1° C.—2 unit vol. vinyl chloride/unit vol. water
20° C.—1 unit vol. vinyl chloride/unit vol. water
35° C.—0.5 unit vol. vinyl chloride/unit vol. water
60° C.—0.1 unit vol. vinyl chloride/unit vol. water
100° C.—0 unit vol. vinyl chloride/unit vol. water (b) Bunsen's solubility coefficient $\alpha$ of vinyl chloride in aqueous PVC-dispersion containing 35 weight % of solid matter, which has the following values at:

6° C.—5 unit vol. vinyl chloride/unit vol. water
18° C.—3 unit vol. vinyl chloride/unit vol. water
26° C.—2 unit vol. vinyl chloride/unit vol. water
54° C.—1 unit vol. vinyl chloride/unit vol. water
74° C.—0.6 unit vol. vinyl chloride/unit vol. water (c) The solubility of vinyl chloride in polyvinyl chloride. The following quantities of vinyl chloride have been found to be dissolved at the following temperatures e.g. in polyvinyl chloride having a mean particle size of 60 up to 120 microns and a K-value of 70 at 0° C.—100 g vinyl chloride/kg polyvinyl chloride
24° C.—50 g vinyl chloride/kg polyvinyl chloride
40° C.—24 g vinyl chloride/kg polyvinyl chloride
60° C.—10 g vinyl chloride/kg polyvinyl chloride
100° C.—4 g vinyl chloride/kg polyvinyl chloride (d) The distribution coefficient of vinyl chloride between water and PVC, which is equal to about 1:15.

We have now unexpectedly found that the phase equilibria commence setting within the temperature range of 90° C. to 100° C. at intervals of 10 up to 100 seconds under conditions which provide for a very effective exchange of constituents between the individual phases of the above mixtures (a)–(c). Temperatures around 100° C., are, however, known to impair the quality of PVC. To avoid this, it is necessary for the influence of temperature on PVC to be limited to several minutes. In order to effectively remove monomeric matter from an aqueous PVC-dispersion at temperatures within the range 90° and 100° C., it is finally necessary to establish conditions, which provide for an effective exchange of constituents and thereby for a complete setting of the phase equilibria, and also for the use of a suitable gas phase enabling the monomeric matter to be removed.

The process of the present invention for removing monomeric matter from an aqueous dispersion of a polymer containing at least 50 weight % of polymerized vinyl chloride comprises: introducing the dispersion into the upper portion of a column provided with sieve plates and contacting the dispersion therein for a period of about 10 seconds up to 20 minutes and under a pressure of about 600 up to 1200 mm Hg with hot steam at about 100 up to 150° C. flowing countercurrently with respect to the dispersion; removing the polymer dispersion so treated from the column base portion; and condensing stagewise a vaporous matter mixture issuing at the head of the column so as to recover an aqueous phase and the monomeric matter.

In accordance with a preferred feature of the present invention, the aqueous dispersion contains approximately 10 up to 60 weight %, more preferably 25 up to 40 weight %, of polymeric solids which in turn should preferably contain at least 85 weight % of polymerized vinyl chloride. The term "polymers" as used herein comprises polyvinyl chloride homopolymers and vinyl chloride copolymers, e.g. copolymers of vinyl chloride with vinyl acetate. It is also advantageous for the polymer dispersion to contain between about 0.2 up to 5 weight % of vinyl chloride.

A further preferred feature of the present process comprises heating the polymer to a temperature of about 60° up to 90° C. and then introducing it into the column. The dispersion so preheated is contected inside the column with hot steam ascending therein, which preferably is at a temperature of 100° up to 150° C., and causes a temperature of 90° up to 100° C. to be established in the column head. The column should preferably be operated under a pressure of 700 to 1100 mm Hg. A relatively minor proportion of steam, equal to 1 up to 5 weight % of water, based on the quantity of dispersion supplied to the column, escapes at the head of the column. The polymer dispersion itself is generally allowed to remain in the column over a period of 0.3 up to 10 minutes.

The invention also provides for the aqueous phase obtained on subjecting the vaporous matter mixture issuing overhead to stagewise condensation to be combined with the polymer dispersion ahead of the monomer degasification zone.

The dispersion of vinyl chloride homopolymers, graft polymers or copolymers to be treated in accordance with the present invention can be made by a process, such as that described by H. Kainer in the book entitled "Polyvinylchlorid und Vinylchlorid-Mischpolymerisate," published by Springer-Verlag, Berlin/Heidelberg/New York, 1965, pages 12-59.

BRIEF DESCRIPTION OF THE DRAWING

One exemplary embodiment of the process of the present invention will now be described with reference to the accompanying drawing. Needless to say the invention is in no way limited to the exemplary embodiment specifically described.

DESCRIPTION OF THE PREFERRED EMBODIMENTS

With reference to the drawing:

Steam is introduced through a line 1 into a stripping column 2 for as long as necessary to obtain condensate in a heat exchanger 3. The stripping column 2 comprises a vertical column having sieve plates 4 at certain intervals arranged therein, perpendicularly with respect to the column. The sieve plates 4 have no particular liquid matter inlet or outlet and distinguish in this feature over the inserts normally used in conventional sieve plate columns, such as those described by E. Kirschbaum in "Destillier- und Rektifiziertechnik," Springer-Verlag, Berlin-Göttingen-Heidelberg (1950), page 97. The gas and/or liquid matter apertures 5 provided in the sieve plates have a diameter between 1 and 10 mm, the total surface area of those apertures being equal to 5 up to 50 % of the column's cross-sectional area. Once the stripping column 2 has been warmed up, a polymer dispersion having a mean particle size of about 20 up to 500 microns is introduced thereinto overhead. The dispersion comes from a reservoir 6, travels through a line 7, is preheated in a heat-exchanger 8 and supplied in metered quantities by means of a dosing meter 9. Following this, the stripping column is supplied with the quantity of steam which is necessary to establish a temperature of 90° up to 100° C. in the column head and to expel the monomeric matter from the polymer dispersion. The polymer dispersion so freed from monomeric matter is removed at the base portion of stripping column 2 through a line 10 and the heat exchanger 8. The heat contained in the polymer dispersion is thereby communicated to the heat exchanger 8 and used for preheating fresh polymer dispersion.

The time during which the polymer dispersion remains in the stripping column 2 is critically determined by the number of sieve plates provided, e.g. 5 up to 50 sieve plates, and by the nature of the solid matter particles in the dispersion. The steam supplied to the column is partially used for effecting warm up of the dispersion to the necessary temperature, and mainly used for stripping off and expelling the monomeric matter from the dispersion. The vaporous matter mixture of steam and monomers issuing at the head of the stripping column 2 and travelling through a line 11, is cooled down to a temperature of 5° up to 20° C., and only steam is accordingly condensed. The condensate containing some monomeric matter, i.e. a minor proportion consistent with the monomer's solubility in water, can be removed through a line 13 and combined with the polymer dispersion coming from the reservoir 6. Gaseous monomeric matter, which remains uncondensed in the heat exchanger 3, is delivered through the line 11, a container 12 and a line 14 to a further heat exchanger 15, in which it is completely condensed by cooling down to a temperature of −15° C. The resulting liquefied monomeric matter is collected in a container 16 provided with a line 17 for the removal of gaseous monomer, and with a line 18 for the removal of liquid monomer, for further uses.

The process of the present invention enables polymers to be freed more effectively and more reliably from monomers under ecologically beneficial conditions, and therefore compares very favorably with the prior art methods. More particularly, the polymers so purified only contain traces of monomers, of the approximate order of 10 ppm. In addition to this, the polymers are very pure, so that they can be used in fields not accessible to them heretofore owing to their inadequate purity and relatively high content of monomers. It could not have been foreseen that it is possible for the present process to be successfully carried out in a stripping column with sieve plate inserts therein inasmuch as the apertures provided in the sieve plates would have been expected to become soiled or encrusted with material, which is however not the case. The present process is generally applicable to the removal of monomeric matter from an aqueous polymer dispersion containing polymer particles with a unit weight greater than that of water.

EXAMPLE 1

A polyvinyl chloride dispersion was freed from vinyl chloride contained therein. The operation was effected as shown in the flow scheme of the accompanying drawing. The dispersion contained 6000 ppm of vinyl chloride and 35 weight % of solid matter. The polyvinyl chloride had a K-value of 70, a mean particle size of 65 microns and a power for absorbing softener of 27.7 %. The dispersion was purified in a stripping column 2 which was provided with 20 sieve plates and had an internal diameter of 100 mm. The sieve plates provided in the column were spaced apart at intervals of 150 mm and provided with 250 apertures 2.5 mm wide. Steam at 108° C. was introduced through line 1 into stripping column 2 for as long as necessary to obtain condensed water in heat exchanger 3. While the supply of steam was continued, aqueous polymer dispersion was introduced into the head of stripping column 2 at a throughput rate of 48 1/h, corresponding to a mean sojourn time of 1 minute of the dispersion in the column. The column was more particularly supplied with the quantity of steam necessary to obtain, in heat exchanger 3, about 3 weight % of condensate, based on the quantity of dispersion supplied per hour, and to have a temperature of 95° up to 100° C. in the gas phase near the head of the column, and a temperature of 102° up to 105° C. in the column base portion. The differential pressure in the column was 50 up to 80 mm Hg. 1.5 1/h of vinyl chloride-containing water was collected in container 12 and subsequently combined with the polymer dispersion to be purified. The dispersion taken from the base portion of stripping column 2 contained less than 1 ppm of vinyl chloride in the aqueous phase, and less than 10 ppm of vinyl chloride in the polyvinyl chloride phase. The residual content of vinyl chloride in the polymer dispersion was identified by gas chromatography. 125 g/h of vinyl chloride was condensed in heat exchanger 5 at −30° C.

EXAMPLE 2

The procedure was the same as that described in Example 1, save that the polymer dispersion which was purified contained rigid polyvinyl chloride with a K-value of 62. The polymer particles had a mean particle size of 120 microns and a power for absorbing softener of 13.5 %. The dispersion contained 5200 ppm of vinyl chloride. The dispersion was put through the column at a rate of 48 1/h, corresponding to a mean 2 minute sojourn time of the dispersion in the column. The column was supplied with the quantity of steam necessary to obtain, in heat exchanger 3, about 5 weight % of condensate, based on the quantity of dispersion supplied per hour. The purified dispersion was found to contain 10 ppm of vinyl chloride in the solid matter, and less than 1 ppm of vinyl chloride in the aqueous phase.

We claim:

1. In a process for removing monomeric matter from an aqueous polymer dispersion, the polymer dispersion containing at least 50 weight % of polymerized vinyl chloride by contacting the polymer dispersion with steam, the improvement which comprises introducing the aqueous polymer dispersion in the form of dispersed particles ranging in size from about 20–500 microns into the upper portion of the column provided with sieve plates having apertures with a diameter ranging from 1–10 mm whereby the dispersion flows substantially continuously through the column and sieve plates, contacting the dispersion therein for a sojourn time of the polymer dispersion in the column of 0.3 up to 10 minutes and under a pressure of about 600 up to 1200 mm Hg with hot steam at about 100° to 150° C. flowing at a substantially constant rate and counter-currently with respect to the substantially continuously flowing dispersion whereby the polymer particles are maintained in suspension and prevented from clogging the sieve plates through which they pass, a vaporous matter mixture containing the aqueous polymer dispersion passes through the sieve plates with the counter-current flow of steam; removing the polymer dispersion so treated from the column base portion; and condensing stagewise a vaporous matter mixture issuing at the head of the column so as to recover an aqueous phase and the monomeric matter.

2. The process as claimed in claim 1, wherein the aqueous dispersion contains about 10 up to 60 weight %, of solid matter.

3. The process as claimed in claim 1, wherein the polymer contains at least 85 weight % of polymerized vinyl chloride.

4. The process as claimed in claim 1, wherein the polymer is a copolymer of vinyl chloride and vinyl acetate.

5. The process as claimed in claim 1, wherein the aqueous dispersion contains about 0.2 up to 5 weight % of vinyl chloride.

6. The process as claimed in claim 1, wherein the polymer dispersion is preheated to a temperature of about 60° up to 90° C. and then introduced into the column.

7. The process as claimed in claim 1, wherein the dispersion is contacted under a pressure of 700 up to 1100° C. with hot water having a temperature of 100° up to 110° C. and flowing countercurrently to the dispersion.

8. The process as claimed in claim 1, wherein a temperature of 90° up to 100° C. is established in the head portion of the column.

9. The process as claimed in claim 1, wherein 1 up to 5 weight % of water, based on the quantity of dispersion supplied, is removed in vapor form from the column.

10. The process as claimed in claim 1, wherein the aqueous phase obtained on subjecting the vaporous matter mixture to stagewise condensation is combined with the polymer dispersion.

* * * * *